United States Patent [19]

Wilcock

[11] Patent Number: 4,621,965
[45] Date of Patent: Nov. 11, 1986

[54] MANIPULATORS

[75] Inventor: Peter D. Wilcock, Wantage, England

[73] Assignee: United Kingdom Atomic Energy Authority, London, England

[21] Appl. No.: 576,940

[22] Filed: Feb. 6, 1984

[30] Foreign Application Priority Data

Feb. 10, 1983 [GB] United Kingdom ............... 8303694

[51] Int. Cl.$^4$ .............................................. B25J 1/02
[52] U.S. Cl. ....................................... 414/7; 414/735; 901/14; 901/21
[58] Field of Search ................ 414/735, 4, 7; 901/14, 901/21; 74/464; 3/1, 1.1, 1.2; 446/368, 383

[56] References Cited

U.S. PATENT DOCUMENTS

| | | | |
|---|---|---|---|
| 2,765,930 | 10/1956 | Greer et al. | 414/7 |
| 3,284,964 | 11/1966 | Saito | 414/7 X |
| 4,393,728 | 7/1983 | Larson et al. | 414/7 X |
| 4,494,417 | 1/1985 | Larson et al. | 74/469 |

FOREIGN PATENT DOCUMENTS

| | | | |
|---|---|---|---|
| 1500113 | 9/1967 | France | 414/7 |
| 2378612 | 8/1978 | France | 414/7 |

Primary Examiner—Terrance L. Siemens
Attorney, Agent, or Firm—William R. Hinds

[57] ABSTRACT

A manipulator arm consisting of a plurality of annuli joined together by lengths of tubing having circumferential corrugations, two longitudinal webs extending the length of the manipulator arm and diametrically spaced with respect to the annuli, the webs being adapted to be flexible in a first plane but stiff in a second plane at right angles to the second plane, and so positioned that the first planes of the webs are coincident thereby to render the manipulator arm flexible in the first plane but stiff in the second plane, and means for causing the manipulator arm to flex in the first plane.

7 Claims, 4 Drawing Figures

MANIPULATORS

The present invention relates to manipulators, that is to say, devices which enable operations to be carried out remotely from an operator. In particular, such devices are used on closed vessels with limited access ports such as those used in connection with vacuum apparatus radioactive materials, on the handling of other hazardous liquids or gases.

Existing manipulators have a number of elbow joints in their construction. Each elbow joint provides for motion about a single axis and the bend radius of a single joint elbow is smaller than the radius of the entry port for the manipulator. This necessarily limits any "sealed working bore" for the manipulator to a small fraction of the bore of the entry port for the manipulator. In order to provide a usable number of degrees of freedom of movement, a number of such joints are required. Each joint has to be of sturdy construction, particularly the one furthest away from the operative end of the manipulator. A result is that the entry port through which the manipulator is inserted into an enclosure in which it is to be used has to be large, which is undesirable if the enclosure forms part of a vacuum chamber or a "cave" containing hazardous materials.

According to the present invention there is provided a manipulator arm consisting of a plurality of annuli joined together by lengths of tubing having circumferential corrugations, two longitudinal webs extending the length of the manipulator arm and diametrically spaced with respect to the annuli, the webs being adapted to be flexible in a first plane but stiff in a second plane at right angles to the first plane, and so positioned that the second planes of the webs are coincident thereby to render the manipulator arm flexible in the first plane but stiff in the second plane, and means for causing the manipulator arm to flex in the first plane.

Preferably the means for causing the manipulator arm to flex in the first plane consists of two cables positioned at the ends of a diameter of the series of annuli at right angles to that joining the webs. Each cable is attached to a winding drum at one end and to the annulus furthest from the drum at the other, so that by shortening one cable relative to the other the lattice beam is caused to deflect in the direction of the shorter cable by the bending movements so applied. Such bending movements can equally well be applied hydraulically, or pneumatically.

In a preferred embodiment of the invention, there are two sections of manipulator arm joined together by a rotatable joint, so that the two lengths of manipulator arm can be caused to be flexible in different planes thereby giving a three-dimensional operating capability to a manipulating head or optical probe mounted at the free end of the manipulator arm.

The invention will now be described, by way of example, with reference to the accompanying drawings, in which.

Figure 1:
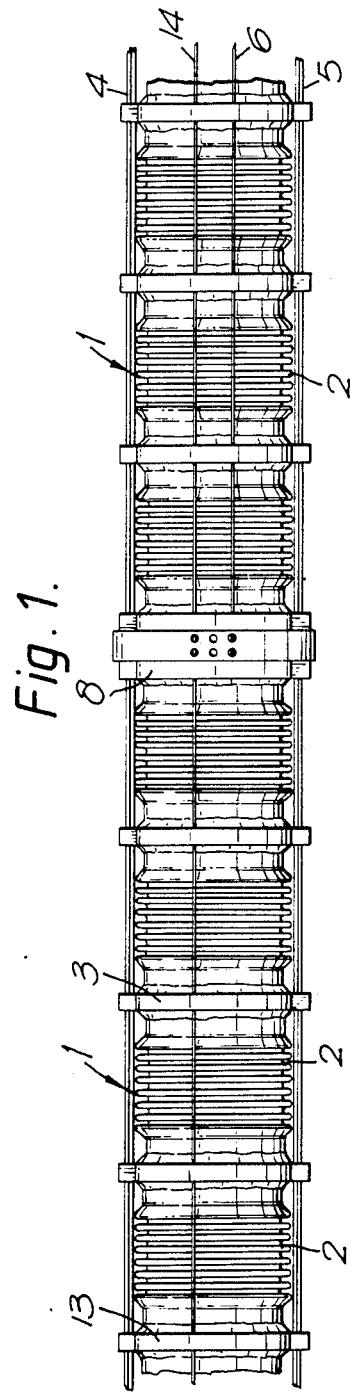
FIG. 1 is a general view of a manipulator embodying the invention.
Figure 3:
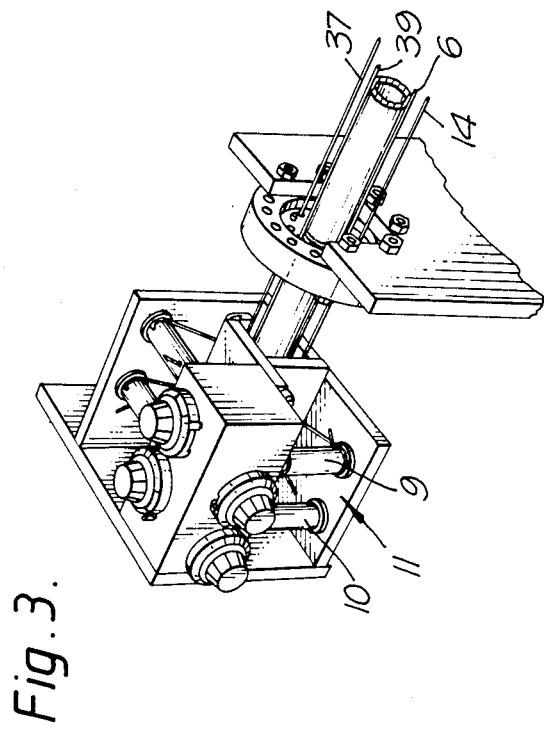
FIG. 3 is an isometric view of a control unit for use with the described embodiment of the invention.
Figure 2:
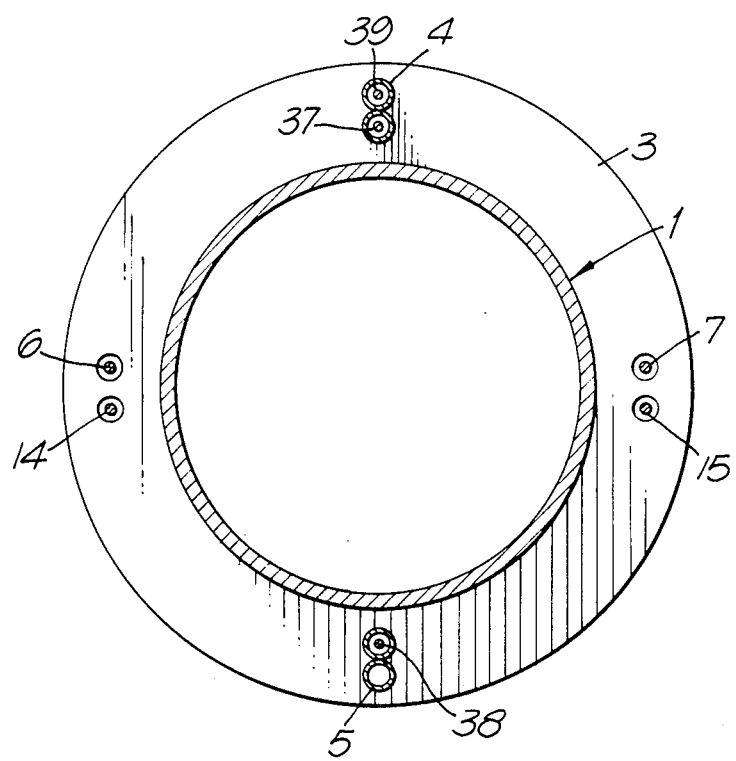
FIG. 2 is a cross-section of a portion of the manipulator arm shown in FIG. 1.

Referring to the drawings, a manipulator arm has a first section made up of a number of lengths 1 of stainless steel tubing which has circumferential corrugations 2. The corrugations 2 make the lengths of the stainless steel tubing 1 flexible. Each length of tubing 1 is joined to its neighbour by an annular flange 3. Two longitudinal webs 4 and 5 of elongated cross-section with their longer cross-sectional axes co-planar pass through holes in the flanges 3 and are attached to them. The assembly forms a lattice beam which is stiff in the plane in which the longer axes of the webs 4 and 5 lie, but flexible in a plane at right angles to that plane. Two longitudinal straining cables 6 and 7 pass freely through other holes in the intermediate flanges 3, but are attached firmly to an end flange 8. The other ends of the straining cables 6 and 7 are attached to winding drums 9 and 10 which form part of a control unit 11. The straining cables 6 and 7 are positioned at the ends of diameter of the flanges 3 which are at right angles to those which join the webs 4 and 5, and define the second plane in which the manipulator arm is relatively flexible. The webs 4 and 5 lie on the neutral axis of the manipulator arm with respect to movements in the second plane.

In the embodiment which is being described, the webs 4 and 5 are made up of two superimposed tubes of circular cross-section which are used to carry control cables for other parts of the apparatus, but of course other configurations can be used. For example, the webs 4 and 5 can be made up of more than two superimposed tubes, single tubes of rectangular cross-section with or without rounded corners, or I-beams.

Attached to the other side of the end flange 8 is a second section of manipulator arm similar in constructions to the first section. The second section of manipulator arm terminates in a rotatable joint 12, to be described in detail later. The webs 4 and 5 extend along the second section of the manipulator arm so that it has the same planes of stiffness and flexibility as the first section. The webs 4 and 5 are firmly attached to a collar 13 which forms a part of the rotatable joint 12. A second set of straining cables 14 and 15 passes freely through holes 16 in the joining flange 8 and all the intermediate flanges 3 of both sections of the manipulator arm. The straining cables 14 and 15 also are made fast to the collar 13 of the rotatable joint 12. Thus the second section of the manipulator arm also can be caused to flex in the same plane as the first section, but independently of it.

Figure 4:
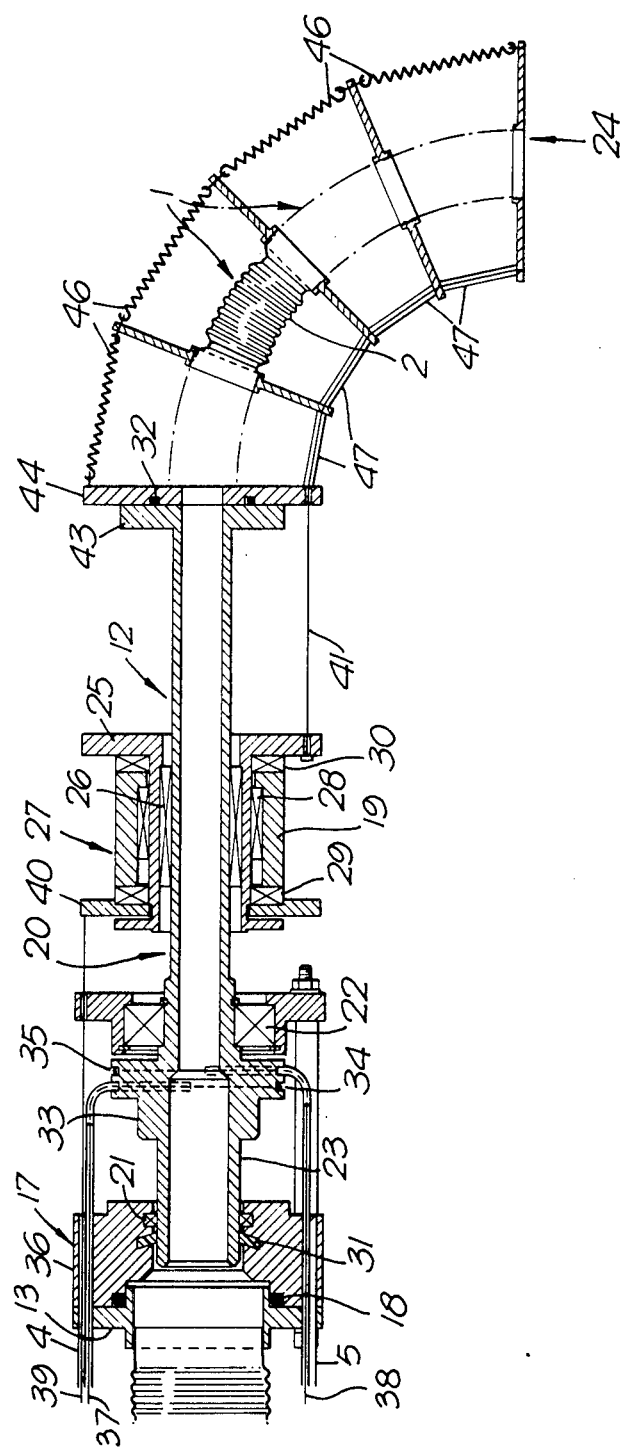
FIG. 4 is a longitudinal section of a rotatable joint joining two sections of the described embodiment of the invention.

Referring specifically to FIG. 4, the rotatable joint 12 consists of the aforementioned collar 13 to which is attached a cylindrical open structure 17 the main part of which is fixed in relation to the collar 13. The junction between the structure 17 and the collar 13 is made vacuum tight by means of an O-ring seal 18. The structure 17 has a portion 19 which can move in an axial sense in relation to the main part of the structure 17 on two guides, which are not shown in the drawing. The portion 19 of the structure 17 also does not rotate in relation to the collar 13. A second cylindrical structure 20 is mounted within the structure 17 by means of bearings 21 and 22. The structure 20 has a main portion 23 which is hollow and connects the second section of the manipulator arm to a third section which forms a probe head 24, and a secondary portion 25 which can move along the main portion 23 by means of a bearing 26 and rotates in conjunction with the main portion 23. The portion 19 of the structure 17 and the secondary portion 25 of the structure 20 form a sub-assembly 27, the two parts of which are free to rotate relative to each other by means of a needle roller bearing 28 and two thrust bearings 29 and 30 and axially along the structure 20 by means of the bearing 26. The junction between the structure 20 and the structure 17 is sealed by means of a rotary vacuum seal 31, and the junction between the structure 20 and the probe head 24 is sealed by means of an O-ring seal 32. The part of the structure 20 which lies within the open portion of the structure 17 has a drum portion 33 which has two circumferential grooves 34 and 35 formed in it. The inner tubes of the webs 4 and 5 pass through a base portion 36 of the structure 17 and extend to the axial positions of the grooves 34 and 35 whereupon they turn towards each other through a right angle and follow the circumference of the drum portion 33 for about a quadrant of the drum portion 33, so that control cables 37 and 38 issuing from the inner tubes of the webs 4 and 5 enter the grooves 34 and 35 tangentially. The control cables 37 and 38 extend around approximately three-quarters of the drum portion 33 and are then fixed to it. Thus tightening one control cable or the other will cause the inner structure 20 to rotate in one direction or the other. The overlap between the cables 37 and 38 enables a full circular movement of the structure 20 to be obtained. Another control cable 39 passes through the upper tube of the web 4 and is attached firmly to a collar 40 which forms part of the detached structure 19.

The other ends of the control cables 37, 38 and 39 are attached to further winding drums in the control unit 11.

The outer end of the structure 20 has a flange 43 to which is bolted an end flange 44 of the probe head 24 of the manipulator arm, of similar general construction to those already described. However, instead of the deflection being controlled by two straining cables, a single cable 41 is used on one side of the probe head 24 together with a series of tension springs 46 on the other. A series of distance pieces 47 limit the amount of deflection of the probe head 24 which can be obtained. This is arranged to be about a right angle. The deflection only occurs in one direction, but because of the full circular motion permitted by the joint 12, this is unimportant. Deflection of the probe head 24 is achieved by pulling on the control cable 39 which moves the sub-assembly 27 to the left in the diagram, so pulling on the cable 41. If the control cable 39 is slackened, then the sub-assembly 27 is free to move to the right. The tension in the cable 41 due to the springs 46 causes this to happen with the result that, as the sub-assembly 27 moves, the tension in the cable 41 is released and the probe head 2 straightens out. The travel allowed the sub-assembly 27 and the lengths of the springs 46 are arranged to be such that when the probe head 24 is straight, some tension remains in the springs 46 and the cable 41 thus providing a degree of rigidity in the probe head 24 in its rest position.

I claim:

1. A manipulator arm consisting of a plurality of annuli joined together by lengths of tubing having circumferential corrugations, two longitudinal webs extending the length of the manipulator arm and diametrically spaced with respect to the annuli, the webs being constructed to be flexible to bend in a first longitudinally extending plane but stiff against bending in a second longitudinally extending plane at right angles to the first plane and so positioned that the second planes of the webs are coincident thereby to render the manipulator arm flexible to bend in the first plane but stiff against bending the the second plane, and means for causing the manipulator arm to flex in the first plane.

2. A manipulator arm according to claim 1 wherein the means for causing the manipulator arm to flex in the first plane comprises at least one cable lying in the first plane and attached at one end to a winding drum and at the other to the annulus furthest from the winding drum and passing freely through holes in the intermediate annuli.

3. A manipulator arm according to claim 2 wherein there are provided two such cables and winding drums, the cables being diametrically opposite each other.

4. A manipulator arm according to claim 2 wherein there are provided a plurality of co-planar tensioning devices linking the annuli and positioned opposite the said cable.

5. A manipulator arm according to claim 1 wherein there are provided two sections of manipulator arm joined together by means of a rotatable joint and means for rotating one section of the manipulator arm relative to the other.

6. A manipulator arm according to claim 1 wherein the webs are hollow and at least one control cable passes therethrough to actuate a device at the free end of the manipulator arm.

7. A manipulator arm according to claim 5 wherein control cables pass through the webs to operate the rotatable joint, and to cause the second section of the manipulator arm to flex in its associated first plane.

* * * * *